US012498995B2

(12) United States Patent
Sagar et al.

(10) Patent No.: US 12,498,995 B2
(45) Date of Patent: Dec. 16, 2025

(54) GENERATING A FEDERATED APPLICATION PROGRAMMING INTERFACE FOR HETEROGENOUS DATA SOURCES

(71) Applicant: Salesforce, Inc., San Francisco, CA (US)

(72) Inventors: Gaurav Sagar, Bellevue, WA (US); Antonio Garrote, San Francisco, CA (US); Patricio Barletta, Brentwood, CA (US); Javier Isoldi, Buenos Aires (AR); Gonzalo Guglielmo, Buenos Aires (AR); Leopoldo Chalub, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/881,250

(22) Filed: Aug. 4, 2022

(65) Prior Publication Data
US 2024/0045743 A1 Feb. 8, 2024

(51) Int. Cl.
*G06F 3/00* (2006.01)
*G06F 9/54* (2006.01)
*G06F 16/27* (2019.01)

(52) U.S. Cl.
CPC .............. *G06F 9/544* (2013.01); *G06F 16/27* (2019.01)

(58) Field of Classification Search
CPC ...................................... G06F 9/542
USPC ....................................... 719/328
See application file for complete search history.

(56) References Cited

U.S. PATENT DOCUMENTS

| 6,675,226 | B1 * | 1/2004 | Nair ................... | G05B 19/0423 |
| | | | | 709/250 |
| 8,881,107 | B2 * | 11/2014 | Bradley .............. | G06F 11/3636 |
| | | | | 717/124 |
| 9,218,443 | B1 * | 12/2015 | Styles ..................... | G06F 8/451 |
| 9,813,509 | B1 * | 11/2017 | Visser ..................... | G06F 9/547 |
| 10,628,560 | B1 * | 4/2020 | Siranni .............. | G06F 21/6281 |
| 10,929,211 | B1 * | 2/2021 | Mylavarapu ........ | G06F 11/3466 |

(Continued)

OTHER PUBLICATIONS

Naser Peiravian, Machine Learning for Android Malware Detection Using Permission and API Calls. (Year: 2013).*

(Continued)

*Primary Examiner* — Lechi Truong
(74) *Attorney, Agent, or Firm* — Holland & Hart LLP

(57) ABSTRACT

Methods, systems, and devices for data processing are described. A federation management service may receive a user selection of a first data source and a second data source via a user interface of the federation management service. The first data source and the second data source may be associated with different data source types. The federation management service may extract schema information from the first data source and the second data source by using source extensions to parse the first data source and the second data source. The federation management service may generate a federated data model by using the schema information to translate the first data source and the second data source into intermediate data sources with a common feature set. Accordingly, the federation management service may generate a target data schema for a federated application programming interface (API) based on the federated data model.

18 Claims, 12 Drawing Sheets

(56) References Cited

U.S. PATENT DOCUMENTS

| | | | | |
|---|---|---|---|---|
| 2001/0004737 | A1* | 6/2001 | Laux | G06F 16/256 |
| 2005/0044187 | A1* | 2/2005 | Jhaveri | H04L 9/40 |
| | | | | 709/219 |
| 2005/0097533 | A1* | 5/2005 | Chakrabarti | G06F 8/4443 |
| | | | | 717/144 |
| 2006/0265385 | A1* | 11/2006 | Agrawal | G06F 16/256 |
| 2007/0283438 | A1* | 12/2007 | Fries | G06F 11/1448 |
| | | | | 726/24 |
| 2010/0011013 | A1* | 1/2010 | Singh | G06F 16/258 |
| | | | | 707/E17.122 |
| 2013/0097320 | A1* | 4/2013 | Ritter | G06Q 10/06 |
| | | | | 709/226 |
| 2015/0089673 | A1* | 3/2015 | Beckman | H04L 67/565 |
| | | | | 726/29 |
| 2016/0026710 | A1* | 1/2016 | Laredo | G06F 9/541 |
| | | | | 707/794 |
| 2016/0057159 | A1* | 2/2016 | Yin | H04L 63/145 |
| | | | | 726/23 |
| 2017/0068748 | A1* | 3/2017 | Hu | G06F 16/9017 |
| 2017/0270299 | A1* | 9/2017 | Kim | G06F 21/566 |
| 2017/0310552 | A1* | 10/2017 | Wallerstein | H04L 41/12 |
| 2018/0137279 | A1* | 5/2018 | Peyton, Jr. | G06F 21/577 |
| 2018/0150325 | A1* | 5/2018 | Kuo | G06F 9/4843 |
| 2019/0138376 | A1* | 5/2019 | Christy Jesuraj | G06F 9/54 |
| 2019/0332667 | A1* | 10/2019 | Williams | G06N 5/022 |
| 2020/0133751 | A1* | 4/2020 | Bahrami | G06F 9/54 |
| 2020/0183714 | A1* | 6/2020 | Wang | H04L 41/40 |
| 2020/0301702 | A1* | 9/2020 | Singh | G06F 8/73 |
| 2021/0319043 | A1* | 10/2021 | You | G06F 16/2465 |

OTHER PUBLICATIONS

Joel Stremmel, Pretraining Federated Text Models for Next Word Prediction. (Year: 2016).*
Peter Pietzuch, Towards a Common API for Publish/Subscribe. (Year: 2007).*
Adam Agocs, A web service based on RESTful API and JSON Schema/JSON Meta Schema to construct knowledge graphs. (Year: 2018).*
Hoan Anh Nguyen, A Graph-based Approach to API Usage Adaptation. (Year: 2010).*
Chaoyang He, A Research Library and Benchmark for Federated Machine Learning. (Year: 2020).*
Bogdan Czejdo, An Approach to Schema Integration and Query Formulation in Federated Database Systems. (Year: 1987).*
Tova Milo, Using Schema Matching to Simplify Heterogeneous Data Translation. (Year: 1998).*

* cited by examiner

GENERATING A FEDERATED APPLICATION PROGRAMMING INTERFACE FOR HETEROGENOUS DATA SOURCES

FIELD OF TECHNOLOGY

The present disclosure relates generally to data processing, and more specifically to generating a federated application programming interface (API) for heterogenous data sources.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant data processing system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may interface with one or more databases, application programming interfaces (APIs), or web services. These data sources may use different API formats, network protocols, etc. Moreover, these data sources may support different capabilities. As such, users of the cloud platform may be unable to access these data sources in a uniform manner.

DETAILED DESCRIPTION

Figure 1:
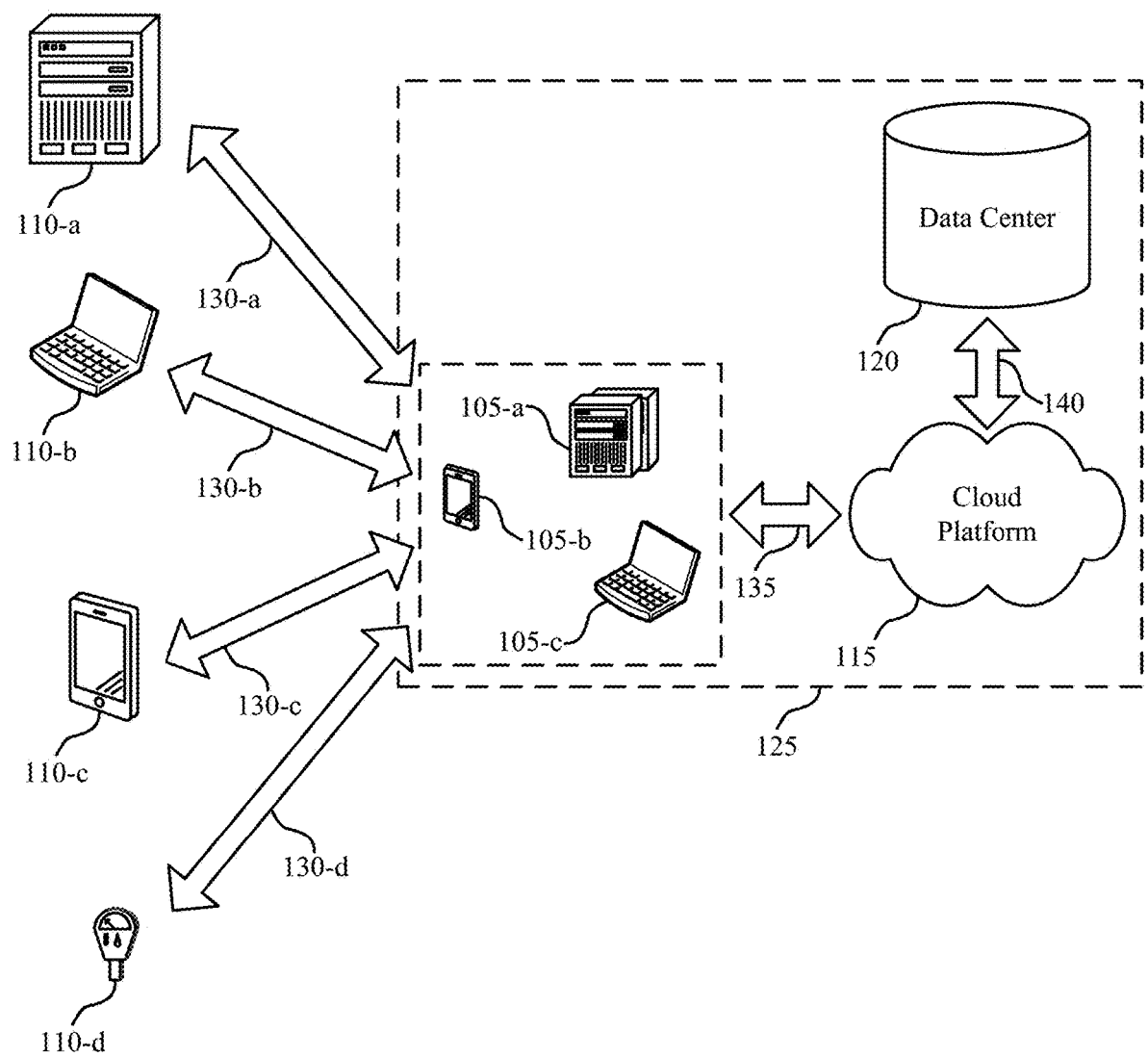
FIG. 1 illustrates an example of a data processing system that supports generating a federated application programming interface (API) for heterogenous data sources in accordance with aspects of the present disclosure.

Some software applications may retrieve data from multiple data sources. For example, an application that provides the status of an online purchase may retrieve data from a first data source that includes shipping information related to the online purchase, a second data source that includes order status information related to the online purchase, and a third data source that includes details related to the item being purchased. The application may interface with these data sources via one or more application programming interfaces (APIs). In some examples, one or more of the data sources may be examples of source APIs. Conventional techniques for retrieving data from source APIs (or other data sources) involve querying individual sources and merging or linking fields via hard-coded relationships.

A federation management service may support a federated (aggregated, unified) API that can provide access to multiple constituent data sources. For example, a user (e.g., an API architect or developer) of the federation management service may declaratively link objects or fields from different data sources via a user interface. The federation management service may generate the federated API with a data schema that is compatible with the underlying data sources. As described herein, a federated API may also be referred to as a DataGraph. In some cases, the federated API may not support data sources with different formats or functionalities. Conventional techniques for aggregating such data sources may involve manually rewriting or adjusting source code, which can be a tedious and error-prone task.

Aspects of the present disclosure support techniques for mapping different source types to a common schema using an intermediate federation layer. These data source types, which may include databases, representational state transfer (REST) APIs, graph query language (GraphQL) APIs, and other API types (such as AsyncAPI), may have an associated schema that defines various fields, relationships, and capabilities (paginations, write operations, streaming capabilities) that are supported for the data source. Using the techniques described herein, capabilities of different source types can be mapped to common a common feature set supported by the federated API. Features and capabilities that are not supported by the federated API can be discarded. As such, the intermediate federation layer provides end users with a consistent set of types, fields, and connections for the underlying data sources (regardless of source type).

In some examples, the intermediate federation layer may generate or otherwise obtain metadata annotations that describe how to fetch or query each source type. For example, the intermediate federation layer may retrieve run-time information and other metadata that indicates which network protocol can be used to fetch data from a specific data source. When a query is processed by the federated API, these metadata annotations can be used to translate the query into a source-specific fetch operation (e.g., a hypertext transfer protocol (HTTP) request for an HTTP API, a query push for a GraphQL API). In some examples, the intermediate federation layer (equivalently referred to as a federation management service) may generate or otherwise configure a data model for the federated API by using one or more source extensions to extract schema information from the underlying data sources.

Aspects of the present disclosure may be implemented to realize one or more of the following advantages. The described techniques may result in higher user satisfaction, reduced manual interaction, and greater processing efficiency, among other examples. More specifically, the techniques described herein may enable users of a federation management service to access heterogenous data sources (e.g., data sources with different API formats, functionalities, or data schemas) via a federated API that is compatible with a wide range of source types. Using a federated API that can automatically integrate different source formats may result in fewer errors and less manual intervention (in comparison to conventional solutions that utilize code wrappers and source code modifications).

Aspects of the disclosure are initially described in the context of data processing systems, computing environments, flowcharts, and process flows. Aspects of the disclosure are further illustrated by and described with reference to apparatus diagrams, system diagrams, and flowcharts that relate to generating a federated API for heterogenous data sources.

FIG. 1 illustrates an example of a data processing system 100 for cloud computing that supports generating a federated API for heterogenous data sources in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not shown). Sub-system 125 may include cloud clients 105, cloud platform 115, and data center 120. In some cases, data processing may occur at any of the components of sub-system 125, or at a combination of these components. In some cases, servers may perform the data processing. The servers may be a cloud client 105 or located at data center 120. The cloud platform 115 may be implemented using any number of physical machines, virtual machines, application servers, cloud servers, or other devices in the same computing environment or in different computing environments.

In accordance with aspects of the present disclosure, a federation management service supported by the cloud platform 115 may receive a user selection of a first data source and a second data source via a user interface of the federation management service. The first data source and the second data source may be associated with different data source types. The federation management service may extract schema information from the first data source and the second data source by using source extensions to parse the first data source and the second data source. The federation management service may generate a federated data model by using the schema information to translate the first data source and the second data source into intermediate data sources with a common feature set supported by the federation management service. Accordingly, the federation management service may generate a target data schema for a federated API based on the federated data model.

Aspects of the data processing system 100 may be implemented to realize one or more of the following advantages. The techniques described with reference to FIG. 1 may result in higher user satisfaction, reduced manual interaction, and greater processing efficiency, among other examples. More specifically, the techniques described herein may enable users of a federation management service to access heterogenous data sources (e.g., data sources with different API formats, functionalities, or data schemas) via a federated API that is compatible with a wide range of source types. Using a federated API that can automatically integrate different source formats may result in fewer errors and less manual intervention (in comparison to conventional solutions that utilize code wrappers and source code modifications).

It should be appreciated by a person skilled in the art that one or more aspects of the disclosure may be implemented in a system (e.g., the data processing system 100) to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
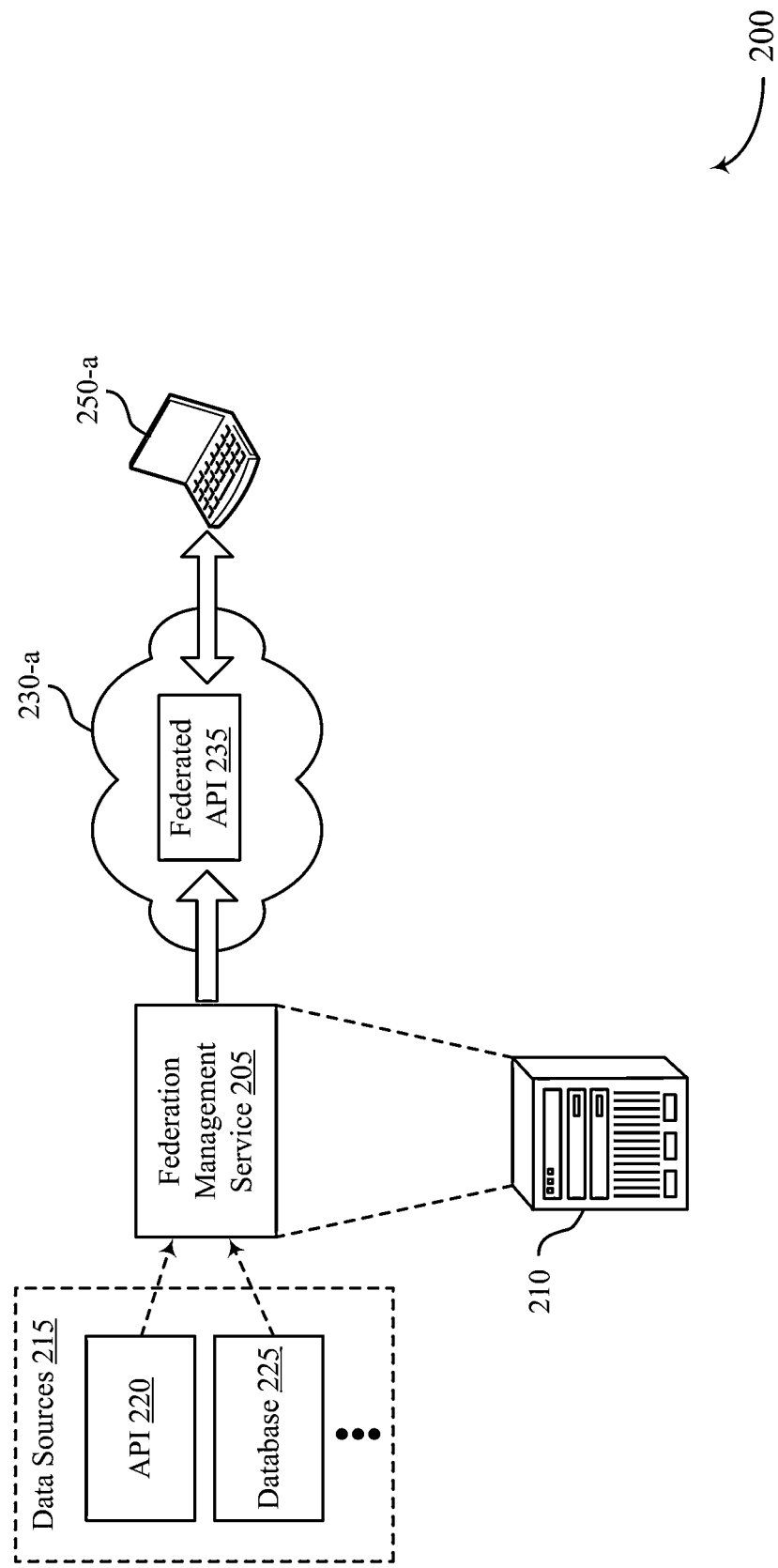
FIG. 2 illustrates an example of a computing environment that supports generating a federated API for heterogenous data sources in accordance with aspects of the present disclosure.

FIG. 2 illustrates an example of a computing environment 200 that supports generating a federated API for heterogenous data sources in accordance with aspects of the present disclosure. the computing environment 200 may implement or be implemented by aspects of the data processing system 100. For example, the computing environment 200 may include a server 210, hosts 230, and client devices 250. The server 210 may be an example of aspects of the cloud platform 115 or the sub-system 125, as described with reference to FIG. 1. The server 210 may represent various physical or logical computing systems that support a federation management service 205 that can be used by clients or tenants (e.g., a cloud client 105 described with reference to FIG. 1) to access applications via client devices 250.

Some applications (e.g., client applications executing on client devices 250, web services, or cloud servers) may retrieve data from multiple data sources, such as data sources 215. For example, an application (or a service supported by an application) may provide a status of an online purchase order, and the application may retrieve data related to shipping information from a first data source, data related to order status information from a second data source, and data related to the item being purchased from a third data source. The application may interface with these data sources using respective APIs. The data sources may include RESTful APIs, GraphQL APIs, Async APIs, Google Remote Procedure Call (gRPC) APIs, databases, or the like. Conventional techniques for retrieving data or accessing services may require configuring multiple APIs at an application and configuring the application to process data received from the multiple APIs (e.g., by merging or linking fields via hard-coded relationships).

The federation management service 205 described herein may support the creation of a federated API 235 that provides access to multiple data sources 215. In such examples, a user (e.g., an API architect or administrator) may declaratively link elements from multiple APIs using a user interface. The federation management service 205 may generate a new API having a unified schema that incorporates the linked elements across the multiple data sources 215. In some examples, the federated API may be referred to as a DataGraph. The federation management service 205 may support a user interface that allows a user to select multiple data sources 215 that are to be included in the federated API 235.

The user may also select various deployment configurations, such as a host environment (e.g., a host 230-a, which may be an example of cloud environment), endpoint details, authentication details, and the like. After selecting configuration parameters, the federation management service 205 may generate the federated API 235 by ingesting or processing the data sources 215 (such as an API 220 or a database 225) based on the corresponding API specifications and/or data schemas. The federated API 235 may be deployed at the host environment (e.g., the host 230-a) based on the user-selected parameters. In some examples, the federated API 235 may be deployed in a cloud environment (e.g., the host 230-a). Additionally, or alternatively, the federated API 235 may be deployed at a local host (e.g., a host associated with or supported by the server 210) or a host associated with a tenant or cloud client.

An application or client (e.g., an application or client executing on a client device 250-b) may be configured to access data and services supported by the underlying data sources 215 via an endpoint of the federated API 235. As such, rather than accessing the data from multiple data source endpoints (for each for the data sources 215), the application may be configured to access the data using one or more endpoints of the federated API 235, which may support improved computing efficiency (at the application and the hosts 230) and reduced complexity. However, in some examples, a federated API may expose the some or all of the data from the underlying data sources 215. This exposure may cause some features of the data sources 215 (such as confidential information or experimental elements) to be exposed to end users (e.g., the client device 250-a).

Further, an API architect may be unable to specify which parts of the federated API 235 are exposed to a consumer or application, which may be a data governance issue or an access control issue. Moreover, for customers that want to create unique back-end for front-end applications, architects may need to remove or otherwise omit some data types and fields from front-end applications. Additionally, if types and fields of the federated API 235 are queried differently (with different frequencies), the API architect may be unable to create separate endpoints with high compute power for types and fields that are queried more frequently than others.

Techniques described herein support the generation of a sub-graph (e.g., the sub-graph 245) based on a federated API (e.g., the federated API 235). The sub-graph 245 may include a subset of elements from the federated API 235, which may reduce the likelihood of accidentally exposing confidential or experimental elements of the data sources 215. The described techniques may also support customized access (based on application constraints) and targeted scaling, among other benefits. A sub-graph 245 may be referred to as a view, DataGraph view, graph view, sub-API, or the like.

To support generation of the sub-graph 245, the data sources 215 may be configured with tags that correspond to elements of the data sources 215. These tags may indicate whether an element is experimental, confidential, production-ready, whether an element is configured for a particular application or end user environment (operating system), or the like. For example, various operations or fields may be tagged with an indication that the operations or fields are for a specific smartphone operating system. When the data sources 215 (including the tags) are used to generate the federated API 235, the federated API 235 (equivalently referred to as an API specification) may also include the tags.

During configuration of the sub-graph 245, the federation management service 205 may support a user interface that displays the tags in the data sources 215 and the federated API 235. More specifically, the user interface of the federation management service 205 may display the tags for selection by a user. The user may select one or more tags for exclusion or inclusion of corresponding elements into the sub-graph 245. For example, a user may select tags for a specific environment or application that is to access the sub-graph 245.

Additionally, or alternatively, the user may select tags that are to be excluded from the sub-graph 245, such as tags that indicate an element of a data source 215 is experimental or confidential. When the federation management service 205 generates the sub-graph 245 (based on the user selection), the federation management service 205 may include elements corresponding to tags that are selected for inclusion in the sub-graph 245 such that the elements are exposed to a user or application that accesses the sub-graph 245.

The federation management service 205 may also support deployment configurations for the sub-graph 245, such a host or host environment for the sub-graph 245 (e.g., the host 230-b) or a quantity of workers or replicas for the sub-graph 245, among other configurations. The deployment configurations may not impact the implementation of the parent application (e.g., the federated API 235). Additionally, the lifecycle and versioning of the sub-graph 245 may be automatically managed by the federation management service 205.

For example, if one of the data sources 215 is updated, the federation management service 205 may automatically create a new version of the federated API 235 and the sub-graph 245. Updates to the data sources 215 may include additions, deletions, modifications of a tag, updating the specification, etc. In some cases, a user may change tag selections, and a new version of the sub-graph 245 may be automatically generated (without updating the federated API 235). The new version of the sub-graph may be deployed to the host 230-b.

Figure 3:
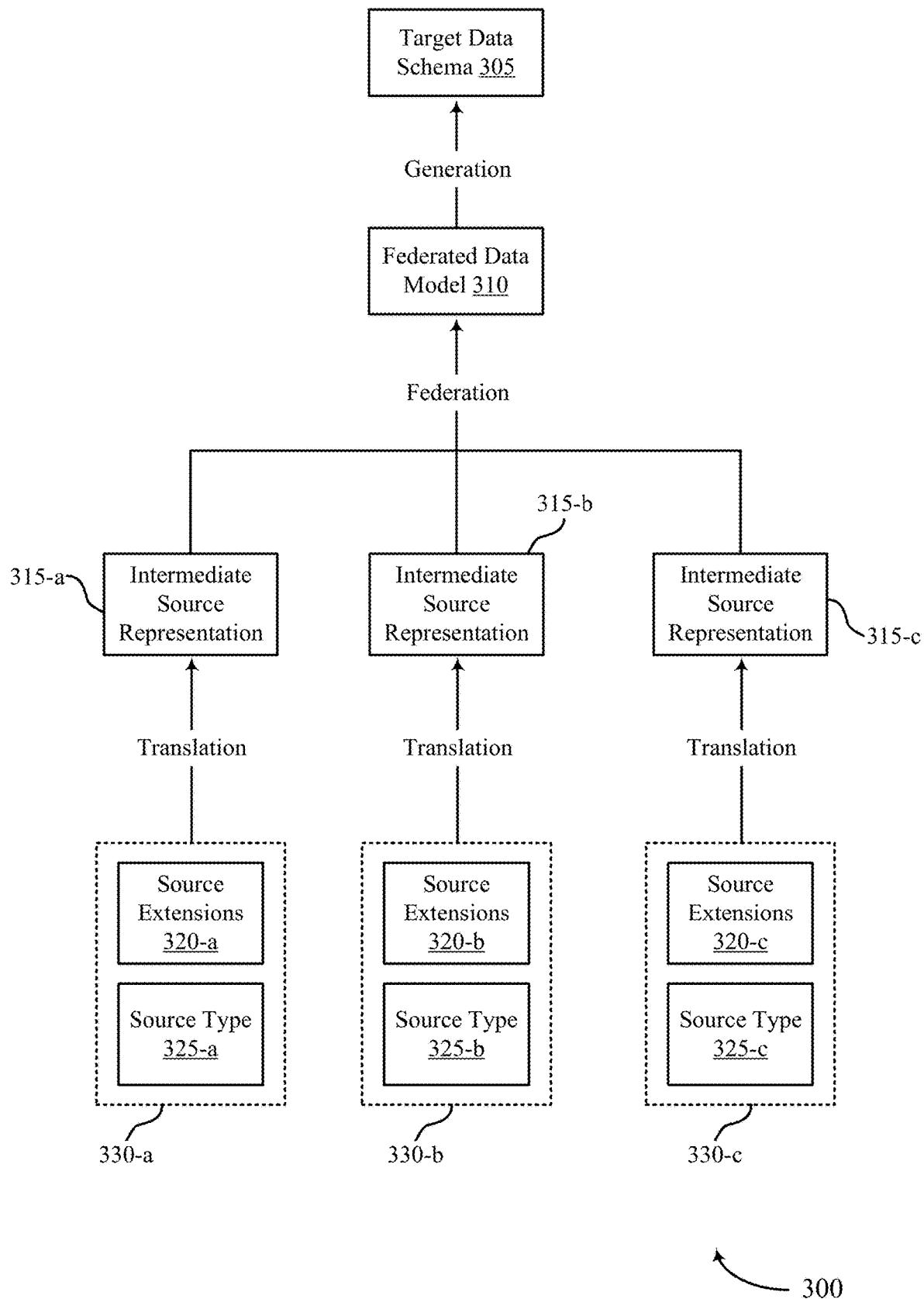
FIGS. 3 and 4 illustrate examples of system diagrams that support generating a federated API for heterogenous data sources in accordance with aspects of the present disclosure.

FIG. 3 illustrates an example of a system diagram 300 that supports generating a federated API for heterogenous data sources in accordance with aspects of the present disclosure. The system diagram 300 may implement or be implemented by aspects of the data processing system 100 or the computing environment 200. For example, the system diagram 300 may include a data source 330-a, a data source 330-b, and a data source 330-c, which may be examples of the data sources 215 described with reference to FIG. 2. The system diagram 300 illustrates metadata processing from source APIs to a translated federated GraphQL schema.

As described with reference to FIGS. 1 and 2, a federation management service (e.g., the federation management service 205 described with reference to FIG. 2) may receive a user selection of the data source 330-a, the data source 330-b, and the data source 330-c via a user interface of the federation management service. In some examples, one or more of the data sources 330 may be associated with different source types. For example, the data source 330-a may be associated with a source type 325-a (GraphQL API), the data source 330-b may be associated with a source type 325-b (REST API), and the data source 330-c may be associated with a source type 325-c (AsyncAPI). Although described in the context of heterogenous data sources, it is to be understood that the techniques and operations described herein may also be applicable to homogenous data sources (e.g., data sources associated with the same API formats, data structures, or network protocols).

Each of the data sources 330 may be configured with a set of source extensions 320 (e.g., the extensions 420 described with reference to FIG. 4). For example, the data source 330-a may include source extensions 320-a, the data source 330-b may include source extensions 320-b, and the data source 330-c may include source extensions 320-c. The federation management service (also referred to as an intermediate metadata federation layer) may use the source extensions 320 to generate an extended graph of the data sources 330 (e.g., the extended graph 415 described with reference to FIG. 4). In some examples, the source extensions 320 may interface with a parsing plugin that is used to generate a semantic graph of the data sources 330 (e.g., the semantic graph 410 described with reference to FIG. 4).

The federation management service may use the source extensions 320, a parsing plugin, metadata format information (e.g., the metadata format information 425 described with reference to FIG. 4), semantic extension definitions (e.g., the semantic extension definitions described with reference to FIG. 4), or a combination thereof to generate intermediate source representations 315 of the data sources 330. For example, the federation management system may generate an intermediate source representation 315-a of the data source 330-a, an intermediate source representation 315-b of the data source 330-b, and an intermediate source representation 315-c of the data source 330-c. The intermediate source representations 315 may have a common feature set that is supported by the federation management service. The common feature set may include read operations, write operations, pagination capabilities, streaming capabilities, etc. In some examples, the federation management service may generate the intermediate source representations 315 by removing (discarding) one or more features or capabilities supported by the data sources 330.

After translating the data sources 330 into the intermediate source representations 315, the federation management service may integrate the intermediate source representations 315 (also referred to as intermediate data sources) into a federated data model 310. Accordingly, the federation management service may generate a target data schema 305 for a federated API (e.g., the federated API 235 described with reference to FIG. 2) based on the federated data model 310. Once configured, the federated API can be used to access the data sources 330 in a uniform manner, even if the data sources 330 are associated with different capabilities, API formats, data schemas, network protocols, etc.

Aspects of the system diagram 300 may be implemented to realize one or more of the following advantages. The techniques described with reference to FIG. 3 may result in higher user satisfaction, reduced manual interaction, and greater processing efficiency, among other examples. More specifically, the techniques described herein may enable users of a federation management service to access the data sources 330 (e.g., heterogenous data sources with different API formats, functionalities, or data schemas) via a federated API that is compatible with a wide range of source types. Using a federated API that can automatically integrate different source formats may result in fewer errors and less manual intervention (in comparison to conventional solutions that utilize code wrappers and source code modifications).

Figure 4:
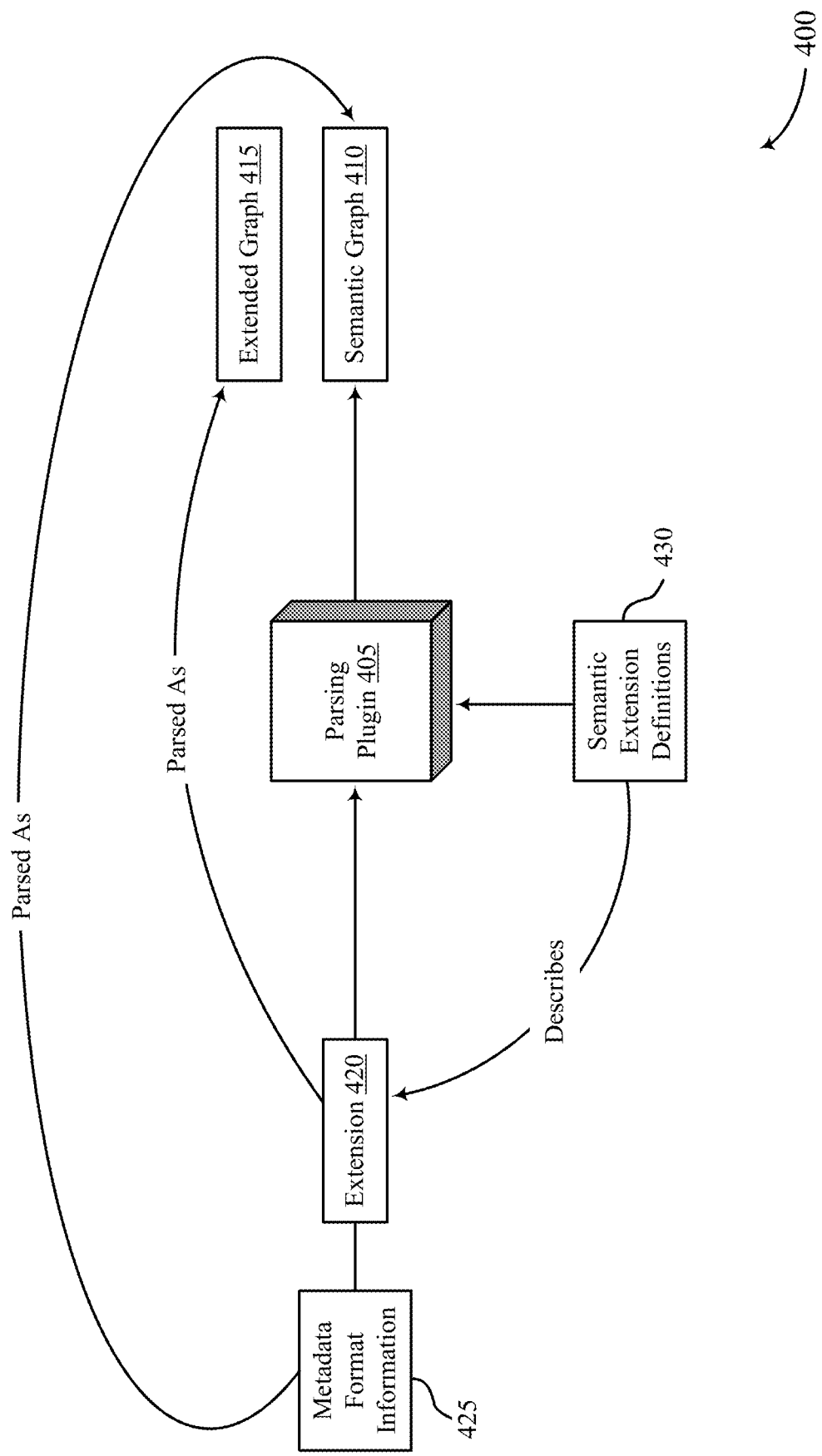

FIG. 4 illustrates an example of a system diagram 400 that supports generating a federated API for heterogenous data sources in accordance with aspects of the present disclosure. The system diagram 400 may implement or be implemented by aspects of the data processing system 100 or the computing environment 200. For example, the system diagram 400 may be implemented by aspects of the cloud platform 115 or the sub-system 125, as described with reference to FIG. 1. The system diagram 400 illustrates an example of a common annotation mechanism across API formats.

As described herein, a federation layer (also referred to as a federation management service) can unify a large number of different services (web services, application services, cloud-based services). These services can be exposed using various network protocols and schema formats. Aspects of the present disclosure support techniques for integrating services that use different protocols and standard formats (with potentially incompatible capabilities) into a single unified schema and network protocol. These services may be integrated via a declarative mechanism that is fully automated and does not require supplemental code from source providers.

In accordance with the techniques described herein, an intermediate metadata federation layer may parse schema information of source APIs (and other data sources) in their native formats and translate this information to an intermediate representation with a common feature set. Supplemental information on data sources can be added through a common metadata annotation mechanism that incorporates the native syntax of the underlying data source. In some examples, this information can be provided interactively through a user interface. The intermediate metadata federation layer may select (negotiate) source API capabilities (write operations, paginations, streaming) and map these capabilities to common features supported by a federated API (e.g., the federated API 235 described with reference to FIG. 2).

The intermediate metadata federation layer may discard (remove) source capabilities that are not supported at the federation level. The process of generating the federated API may be automatically performed by a set of services that connect to a metadata repository, fetch versioned source schema and run-time information, transform source schemas into a common data model, and generate a target (output) schema and a federation gateway service that is automatically deployed and managed by the intermediate metadata federation layer. The federation mechanisms described herein may not be specific to a standard (e.g., a GraphQL Federation standard). Rather, these mechanisms may provide universal support for different API formats and specifications (e.g., API Federation, where GraphQL API, REST API, and AsyncAPI can be directly supported).

The federation mechanisms described herein may be declarative constructs that are configured using metadata of source schemas in native formats. To implement the federation mechanisms described herein, source providers are not required to put code wrappers around source APIs or rewrite source APIs in a unique supported format. In other words, there is no need to rewrite a service or wrap the service in a GraphQL code wrapper because the federation mechanisms described herein are compatible with GraphQL. Source APIs can be extended in a declarative way to provide federation information as a common set of annotations over native syntax. The techniques described herein may be fully automated, and may be implemented without additional code or complex manual interventions from source providers or owners of the federated API.

In the example of FIG. 4, a parsing plugin 405 may use semantic extension definitions 430 and metadata format information 425 to generate a semantic graph 410 and an extended graph 415. The parsing plugin 405 may utilize or otherwise interface with extensions 420 to generate the extended graph 415. The semantic extension definitions 430 may describe various aspects of the extensions 420. The metadata format information 425 may be parsed as the semantic graph 410, while the extensions 420 may be parsed as the extended graph 415. The semantic graph 410 and the extended graph 415 may be used to generate a federated data model (e.g., the federated data model 310 described with reference to FIG. 3) for a federated API (e.g., the federated API 235 described with reference to FIG. 2).

Figure 5:
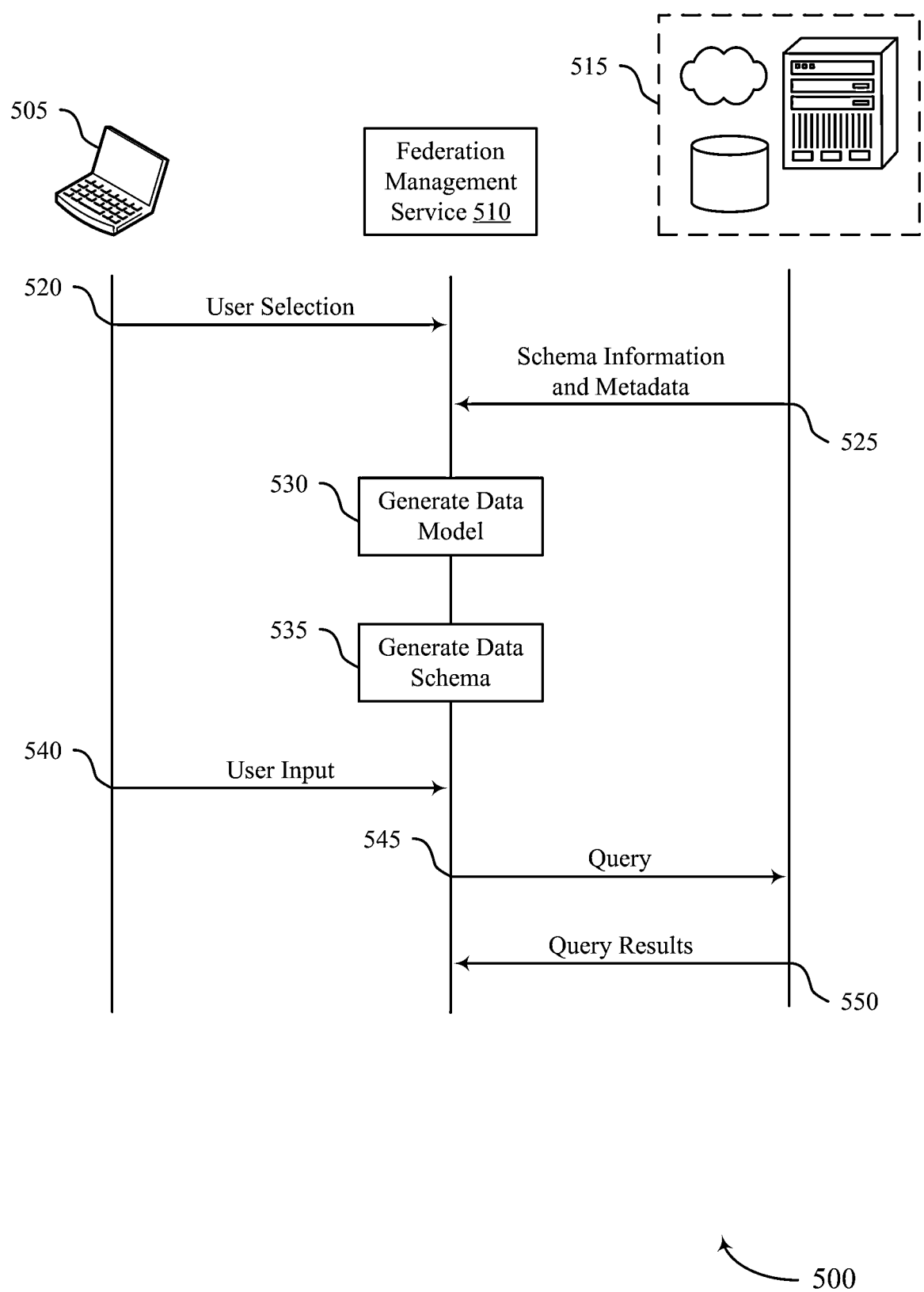
FIG. 5 illustrates an example of a process flow that supports generating a federated API for heterogenous data sources in accordance with aspects of the present disclosure.

FIG. 5 illustrates an example of a process flow 500 that supports generating a federated API for heterogenous data sources in accordance with aspects of the present disclosure. The process flow 500 may implement or be implemented by aspects of the data processing system 100 or the computing environment 200. For example, the process flow 500 may include a client device 505 (e.g., a client device 250 described with reference to FIG. 2), a federation management service 510 (e.g., the federation management service 205 described with reference to FIG. 2), and data sources 515 (e.g., the data sources 215 described with reference to FIG. 2). In the following description of the process flow 500, operations between the client device 505, the federation management service 510, and the data sources 515 may be added, omitted, or performed in a different order (with respect to the exemplary order shown).

At 520, the federation management service 510 may receive (via a user interface or an API call) a user selection from the client device 505. The user selection may indicate a first data source and a second data source of the data sources 515. The first data source and the second data source may, in some examples, be associated with different API formats, network protocols, or data schemas. For example, the first data source may be a REST API, and the second data source may be a database, a GraphQL API, or an AsyncAPI. At 525, the federation management service 510 may extract schema information from the first data source and the second data source by using one or more source extensions (e.g., the extensions 420 described with reference to FIG. 4) to parse the first data source and the second data source. The federation management service 510 may also obtain metadata associated with a first data schema of the first data source or a second (different) data schema of the second data schema.

At 530, the federation management service 510 may generate a federated data model (e.g., the federated data model 310 described with reference to FIG. 3) by using the schema information (extracted from the first data source and the second data source) to translate the first data source and the second data source into intermediate source representations (e.g., the intermediate source representations 315 described with reference to FIG. 3) with a common feature set supported by the federation management service 510. In some examples, the federation management service 510 may generate the federated data model by mapping a first set of features supported by the first data source and a second set of features supported by the second data source to the common feature set supported by the federation management service 510.

At 535, the federation management service 510 may generate a target data schema (e.g., the target data schema 305 described with reference to FIG. 3) based on the federated data model, the metadata (obtained at 525), one or more metadata annotations received via the user interface, a semantic graphical representation of the data sources 515, an extended graphical representation of the data sources 515, or some combination thereof. In some examples, the federation management service 510 may store schema version information and run-time information for the data sources 515 in a metadata repository. At run-time, the federation management service 510 may retrieve this information and generate a source-specific fetch request based on the information retrieved from the metadata repository.

At 540, the federation management service 510 may receive (via the user interface) a user input from the client device 505. The user input may indicate a query related to one or more data objects associated with (stored in or otherwise accessible via) one of the data sources 515. At 545, the federation management service 510 may query the data sources 515 for information related to the one or more data objects indicated by the query. At 550, the federation management service 510 may obtain (from the data sources 515) query results associated with the one or more data objects. In some examples, the federation management service 510 may transmit an indication of the query results for display at the client device 505.

Aspects of the process flow 500 may be implemented to realize one or more of the following advantages. The techniques described with reference to FIG. 5 may result in higher user satisfaction, reduced manual interaction, and greater processing efficiency, among other examples. More specifically, the techniques described herein may enable users of the federation management service 510 to access the data sources 515 (e.g., heterogenous data sources with different API formats, functionalities, or data schemas) via a federated API that is compatible with a wide range of source types. Using a federated API that can automatically integrate different source formats may result in fewer errors and less manual intervention (in comparison to conventional solutions that utilize code wrappers and source code modifications).

Figure 6:
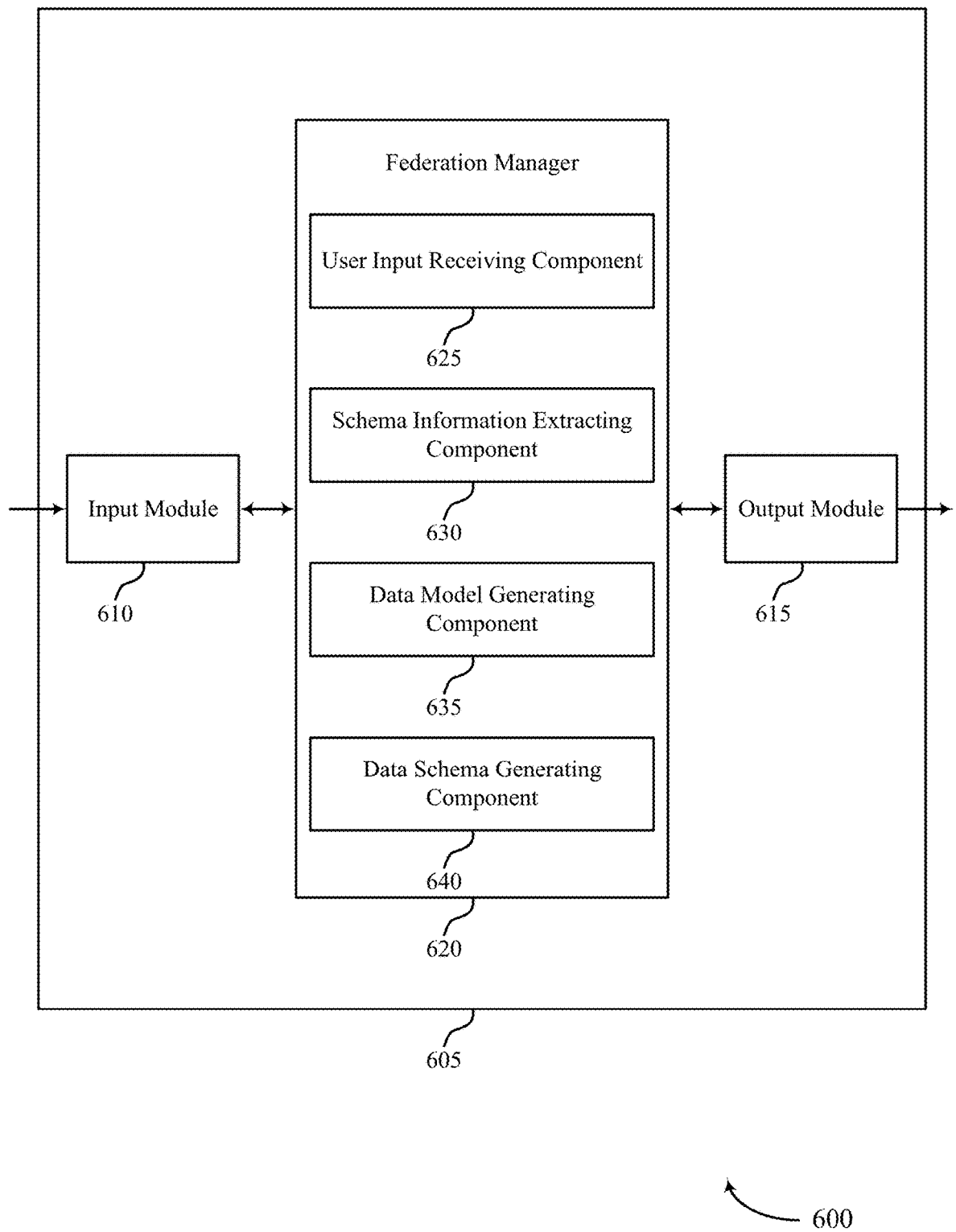
FIG. 6 shows a block diagram of an apparatus that supports generating a federated API for heterogenous data sources in accordance with aspects of the present disclosure.

FIG. 6 shows a block diagram 600 of a device 605 that supports generating a federated API for heterogenous data sources in accordance with aspects of the present disclosure. The device 605 may include an input module 610, an output module 615, and a federation manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the federation manager 620 to support generating a federated API for heterogenous data sources. In some cases, the input module 610 may be a component of an input/output (I/O) controller 810, as described with reference to FIG. 8.

The output module 615 may manage output signals for the device 605. For example, the output module 615 may receive signals from other components of the device 605, such as the federation manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810, as described with reference to FIG. 8.

For example, the federation manager 620 may include a user input receiving component 625, a schema information extracting component 630, a data model generating component 635, a data schema generating component 640, or any combination thereof. In some examples, the federation manager 620, or various components thereof, may be configured to perform various operations (e.g., receiving, monitoring, transmitting) using or otherwise in cooperation with the input module 610, the output module 615, or both. For example, the federation manager 620 may receive information from the input module 610, send information to the output module 615, or be integrated in combination with the input module 610, the output module 615, or both to receive information, transmit information, or perform various other operations as described herein.

The federation manager 620 may support data processing in accordance with examples disclosed herein. The user input receiving component 625 may be configured as or otherwise support a means for receiving, via a user interface of a federation management service, a user selection of a first data source associated with a first data source type and a second data source associated with a second data source type that is different from the first data source type. The schema information extracting component 630 may be configured as or otherwise support a means for extracting schema information from the first data source and the second data source by using one or more source extensions to parse the first data source and the second data source. The data model generating component 635 may be configured as or otherwise support a means for generating a federated data model by using the schema information to translate the first data source and the second data source into intermediate data sources with a common feature set supported by the federation management service. The data schema generating component 640 may be configured as or otherwise support a means for generating a target data schema for a federated API based on the federated data model.

Figure 7:
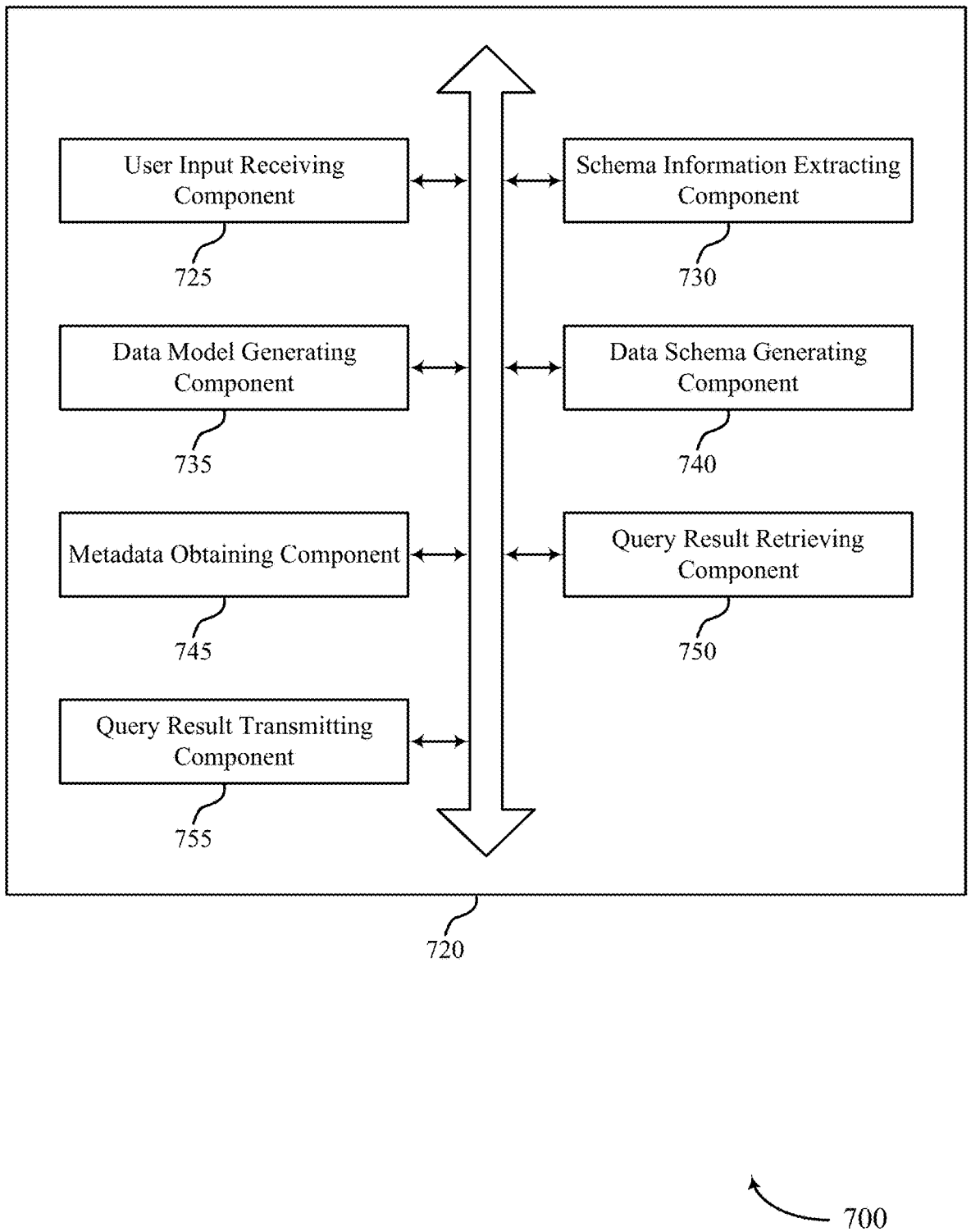
FIG. 7 shows a block diagram of a federation manager that supports generating a federated API for heterogenous data sources in accordance with aspects of the present disclosure.

FIG. 7 shows a block diagram 700 of a federation manager 720 that supports generating a federated API for heterogenous data sources in accordance with aspects of the present disclosure. The federation manager 720 may be an example of the federation manager 620, as described with reference to FIG. 6. The federation manager 720, or various components thereof, may be an example of means for performing various aspects of generating a federated API for heterogenous data sources as described herein. For example, the federation manager 720 may include a user input receiving component 725, a schema information extracting component 730, a data model generating component 735, a data schema generating component 740, a metadata obtaining component 745, a query result retrieving component 750, a query result transmitting component 755, or any combination thereof. Each of these components may communicate, directly or indirectly, with one another (e.g., via one or more buses).

The federation manager 720 may support data processing in accordance with examples disclosed herein. The user input receiving component 725 may be configured as or otherwise support a means for receiving, via a user interface of a federation management service, a user selection of a first data source associated with a first data source type and a second data source associated with a second data source type that is different from the first data source type. The schema information extracting component 730 may be configured as or otherwise support a means for extracting schema information from the first data source and the second data source by using one or more source extensions to parse the first data source and the second data source. The data model generating component 735 may be configured as or otherwise support a means for generating a federated data model by using the schema information to translate the first data source and the second data source into intermediate data sources with a common feature set supported by the federation management service. The data schema generating component 740 may be configured as or otherwise support a means for generating a target data schema for a federated API based on the federated data model.

In some examples, the metadata obtaining component 745 may be configured as or otherwise support a means for obtaining metadata associated with a first data schema of the first data source and a second data schema of the second data source, where generating the target data schema for the federated API is based on the metadata.

In some examples, the user input receiving component 725 may be configured as or otherwise support a means for receiving, via the user interface of the federation management service, a user input that includes one or more metadata annotations associated with the first data source and the second data source, where generating the target data schema for the federated API is based on the one or more metadata annotations.

In some examples, the user input receiving component 725 may be configured as or otherwise support a means for receiving, via the user interface of the federation management service, a query related to one or more data objects from the first data source or the second data source.

In some examples, the query result retrieving component 750 may be configured as or otherwise support a means for retrieving query results associated with the one or more data objects by using the federated API to access one or both of the first data source or the second data source.

In some examples, the query result transmitting component 755 may be configured as or otherwise support a means for transmitting, for display at the user interface of the federation management service, an indication of the query results associated with the one or more data objects.

In some examples, the schema information extracting component 730 may be configured as or otherwise support a means for retrieving schema version information and run-time information associated with one or both of the first data source or the second data source, where the federated API uses the schema version information and the run-time information to access one or both of the first data source or the second data source.

In some examples, to support generating the federated data model, the data model generating component 735 may be configured as or otherwise support a means for mapping a first set of features supported by the first data source and a second set of features supported by the second data source to the common feature set supported by the federation management service.

In some examples, to support generating the federated data model, the data model generating component 735 may be configured as or otherwise support a means for generating a semantic graph representation and an extended graph representation of the intermediate data sources using a parsing plug-in that interfaces with the one or more source extensions.

In some examples, the common feature set supported by the federation management service includes read operations, write operations, pagination operations, streaming operations, or a combination thereof.

In some examples, the first data source and the second data source have different feature sets and different API formats. In some examples, one or both of the first data source or the second data source may include a REST API, a GraphQL API, or an AsyncAPI.

Figure 8:
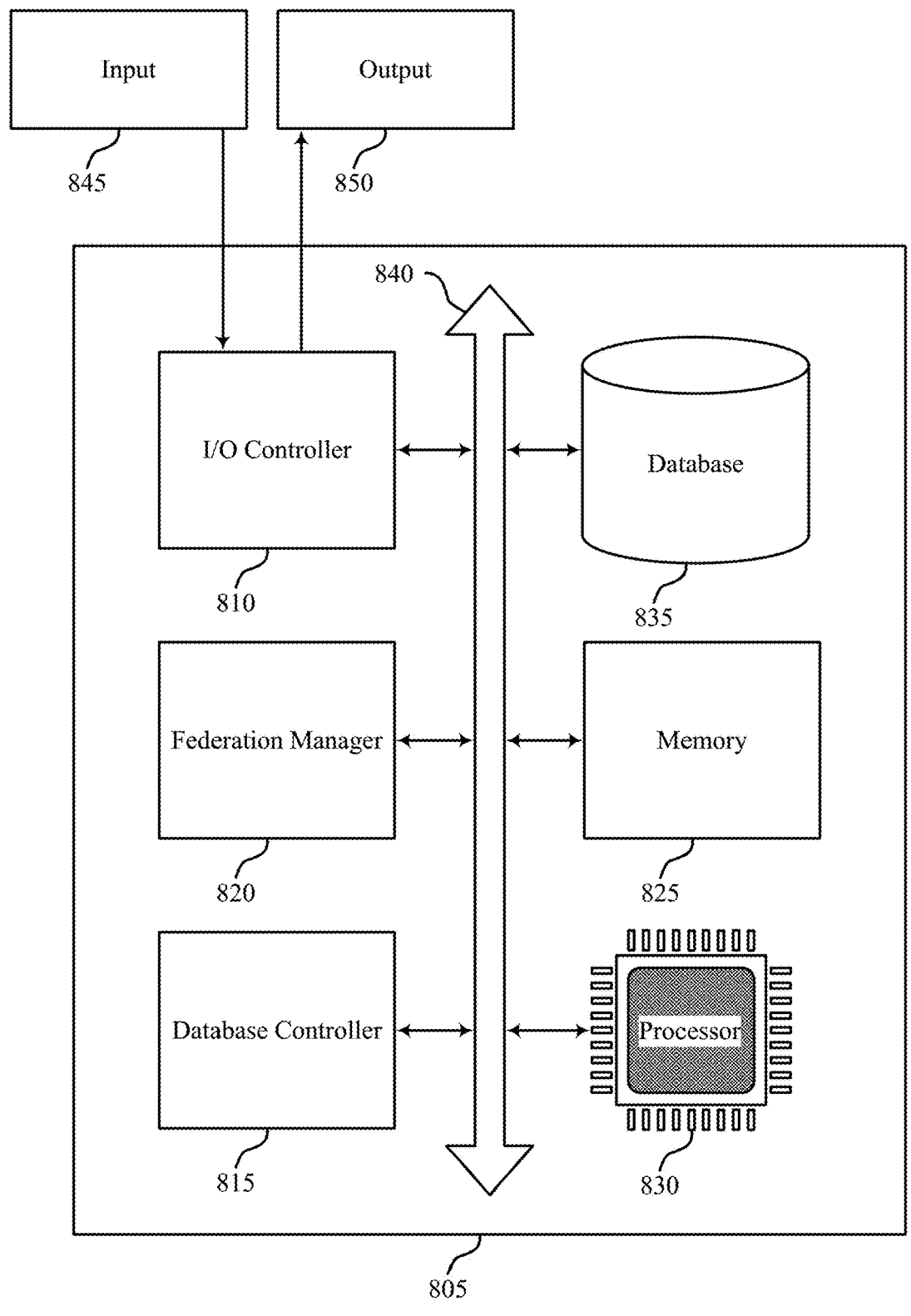
FIG. 8 shows a diagram of a system including a device that supports generating a federated API for heterogenous data sources in accordance with aspects of the present disclosure.

FIG. 8 shows a diagram of a system 800 including a device 805 that supports generating a federated API for heterogenous data sources in accordance with aspects of the present disclosure. The device 805 may be an example of or include the components of a device 605, as described with reference to FIG. 6. The device 805 may include components for transmitting and receiving communications, such as a federation manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a basic I/O system (BIOS), which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an ASIC, a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting generating a federated API for heterogenous data sources).

The federation manager 820 may support data processing in accordance with examples disclosed herein. For example, the federation manager 820 may be configured as or otherwise support a means for receiving, via a user interface of a federation management service, a user selection of a first data source associated with a first data source type and a second data source associated with a second data source type that is different from the first data source type. The federation manager 820 may be configured as or otherwise support a means for extracting schema information from the first data source and the second data source by using one or more source extensions to parse the first data source and the second data source. The federation manager 820 may be configured as or otherwise support a means for generating a federated data model by using the schema information to translate the first data source and the second data source into intermediate data sources with a common feature set supported by the federation management service. The federation manager 820 may be configured as or otherwise support a means for generating a target data schema for a federated API based on the federated data model.

By including or configuring the federation manager 820 in accordance with examples as described herein, the device 805 may support techniques for accessing heterogeneous data sources (e.g., data sources that use different network protocols) with greater efficiency and reduced manual interaction. For example, the device 805 may use metadata annotations and schema information to generate a federated API that is compatible with various data source types (REST API, GraphQL API, AsyncAPI). As such, a client device (e.g., a client device 250 described with reference to FIG. 2) can use the federated API to access data sources with greater consistency and reduced manual interaction.

Figure 9:
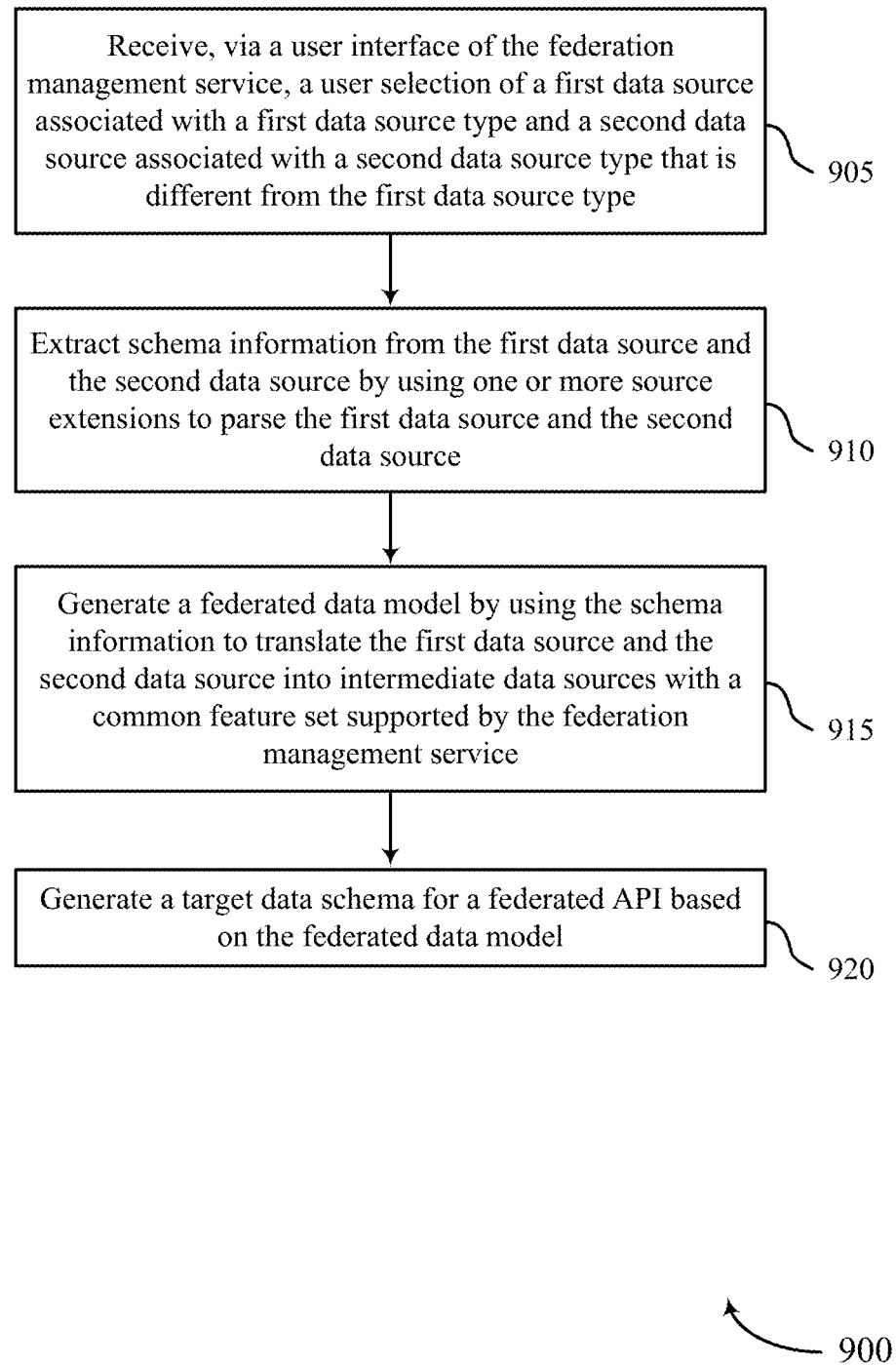
FIGS. 9 through 12 show flowcharts illustrating methods that support generating a federated API for heterogenous data sources in accordance with aspects of the present disclosure.

FIG. 9 shows a flowchart illustrating a method 900 that supports generating a federated API for heterogenous data sources in accordance with aspects of the present disclosure. The operations of the method 900 may be implemented by a federation management service or components thereof. For example, the operations of the method 900 may be performed by a federation management service 510, as described with reference to FIG. 5. In some examples, a federation management service may execute a set of instructions to control the functional elements of the federation management service to perform the described functions. Additionally, or alternatively, the federation management service may perform aspects of the described functions using special-purpose hardware.

At 905, the federation management service may receive, via a user interface of the federation management service, a user selection of a first data source associated with a first data source type and a second data source associated with a second data source type that is different from the first data source type. The operations of 905 may be performed in accordance with examples disclosed herein. In some examples, aspects of the operations of 905 may be performed by a user input receiving component 725, as described with reference to FIG. 7.

At 910, the federation management service may extract schema information from the first data source and the second data source by using one or more source extensions to parse the first data source and the second data source. The operations of 910 may be performed in accordance with examples disclosed herein. In some examples, aspects of the operations of 910 may be performed by a schema information extracting component 730, as described with reference to FIG. 7.

At 915, the federation management service may generate a federated data model by using the schema information to translate the first data source and the second data source into intermediate data sources with a common feature set supported by the federation management service. The operations of 915 may be performed in accordance with examples disclosed herein. In some examples, aspects of the operations of 915 may be performed by a data model generating component 735, as described with reference to FIG. 7.

At 920, the federation management service may generate a target data schema for a federated API based on the federated data model. The operations of 920 may be performed in accordance with examples disclosed herein. In some examples, aspects of the operations of 920 may be performed by a data schema generating component 740, as described with reference to FIG. 7.

Figure 10:
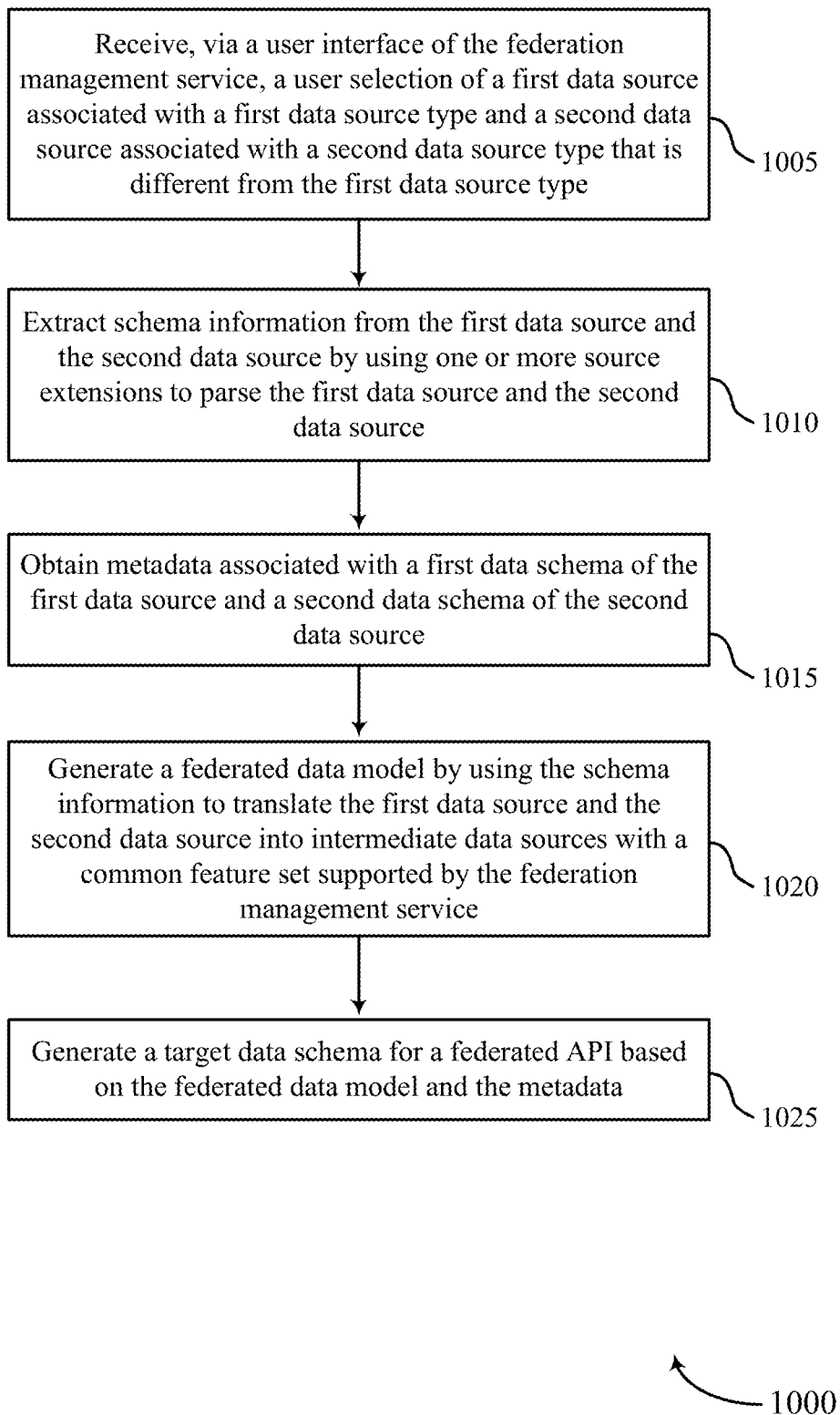

FIG. 10 shows a flowchart illustrating a method 1000 that supports generating a federated API for heterogenous data sources in accordance with aspects of the present disclosure. The operations of the method 1000 may be implemented by a federation management service or components thereof. For example, the operations of the method 1000 may be performed by a federation management service 205, as described with reference to FIG. 2. In some examples, a federation management service may execute a set of instructions to control the functional elements of the federation management service to perform the described functions. Additionally, or alternatively, the federation management service may perform aspects of the described functions using special-purpose hardware.

At 1005, the federation management service may receive, via a user interface of the federation management service, a user selection of a first data source associated with a first data source type and a second data source associated with a second data source type that is different from the first data source type. The operations of 1005 may be performed in accordance with examples disclosed herein. In some examples, aspects of the operations of 1005 may be performed by a user input receiving component 725, as described with reference to FIG. 7.

At 1010, the federation management service may extract schema information from the first data source and the second data source by using one or more source extensions to parse the first data source and the second data source. The operations of 1010 may be performed in accordance with examples disclosed herein. In some examples, aspects of the operations of 1010 may be performed by a schema information extracting component 730, as described with reference to FIG. 7.

At 1015, the federation management service may obtain metadata associated with a first data schema of the first data source and a second data schema of the second data source. The operations of 1015 may be performed in accordance with examples disclosed herein. In some examples, aspects of the operations of 1015 may be performed by a metadata obtaining component 745, as described with reference to FIG. 7.

At 1020, the federation management service may generate a federated data model by using the schema information to translate the first data source and the second data source into intermediate data sources with a common feature set supported by the federation management service. The operations of 1020 may be performed in accordance with examples disclosed herein. In some examples, aspects of the operations of 1020 may be performed by a data model generating component 735, as described with reference to FIG. 7.

At 1025, the federation management service may generate a target data schema for a federated API based on the federated data model and the metadata. The operations of 1025 may be performed in accordance with examples disclosed herein. In some examples, aspects of the operations of 1025 may be performed by a data schema generating component 740, as described with reference to FIG. 7.

Figure 11:
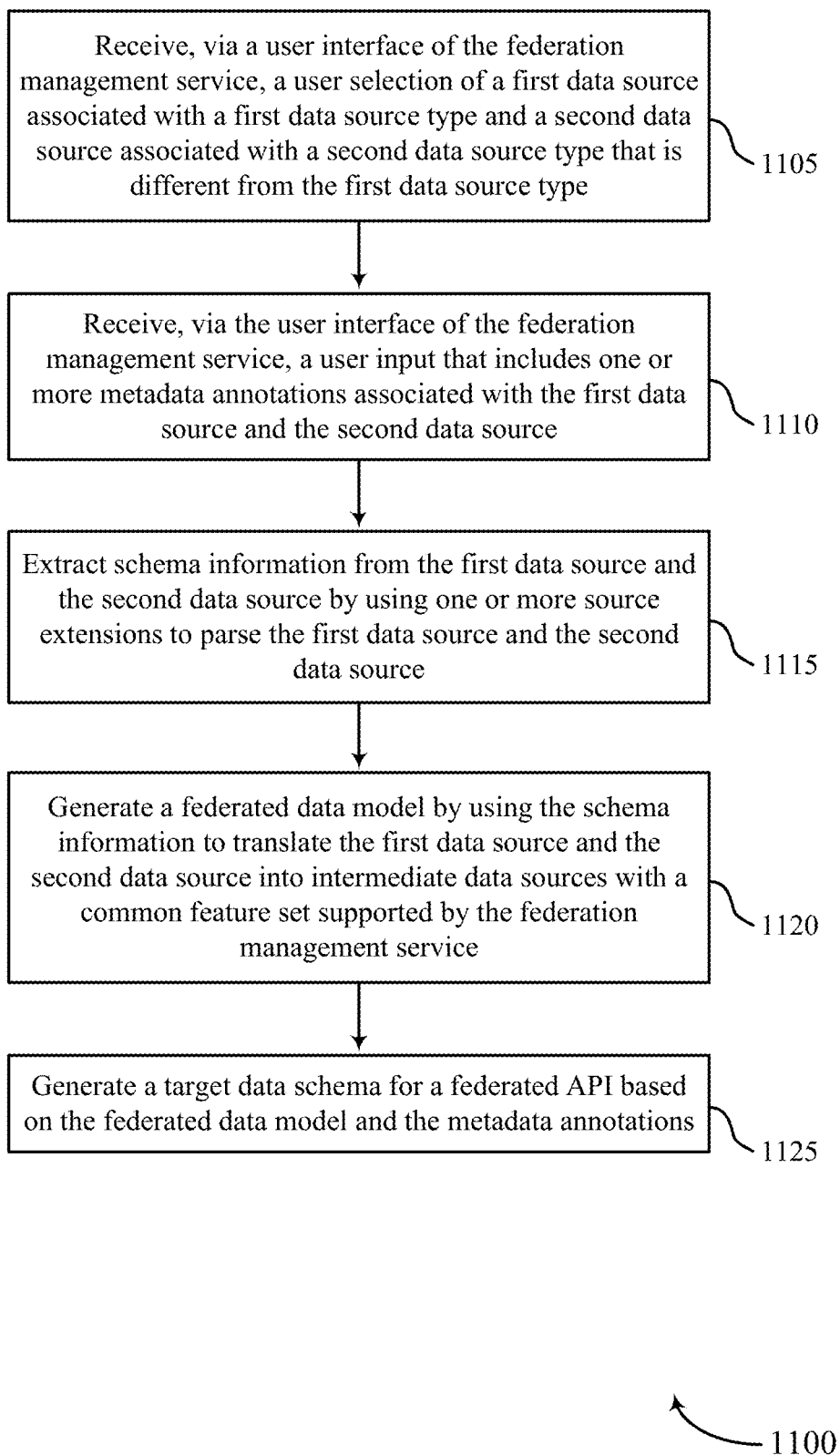

FIG. 11 shows a flowchart illustrating a method 1100 that supports generating a federated API for heterogenous data sources in accordance with aspects of the present disclosure. The operations of the method 1100 may be implemented by a federation management service or components thereof. For example, the operations of the method 1100 may be performed by a federation management service 510, as described with reference to FIG. 5. In some examples, a federation management service may execute a set of instructions to control the functional elements of the federation management service to perform the described functions. Additionally, or alternatively, the federation management service may perform aspects of the described functions using special-purpose hardware.

At 1105, the federation management service may receive, via a user interface of the federation management service, a user selection of a first data source associated with a first data source type and a second data source associated with a second data source type that is different from the first data source type. The operations of 1105 may be performed in accordance with examples disclosed herein. In some examples, aspects of the operations of 1105 may be performed by a user input receiving component 725, as described with reference to FIG. 7.

At 1110, the federation management service may receive, via the user interface of the federation management service, a user input that includes one or more metadata annotations associated with the first data source and the second data source. The operations of 1110 may be performed in accordance with examples disclosed herein. In some examples, aspects of the operations of 1110 may be performed by a user input receiving component 725, as described with reference to FIG. 7.

At 1115, the federation management service may extract schema information from the first data source and the second data source by using one or more source extensions to parse the first data source and the second data source. The operations of 1115 may be performed in accordance with examples disclosed herein. In some examples, aspects of the operations of 1115 may be performed by a schema information extracting component 730, as described with reference to FIG. 7.

At 1120, the federation management service may generate a federated data model by using the schema information to translate the first data source and the second data source into intermediate data sources with a common feature set supported by the federation management service. The operations of 1120 may be performed in accordance with examples disclosed herein. In some examples, aspects of the operations of 1120 may be performed by a data model generating component 735, as described with reference to FIG. 7.

At 1125, the federation management service may generate a target data schema for a federated API based on the federated data model and the one or more metadata annotations. The operations of 1125 may be performed in accordance with examples disclosed herein. In some examples, aspects of the operations of 1125 may be performed by a data schema generating component 740, as described with reference to FIG. 7.

Figure 12:
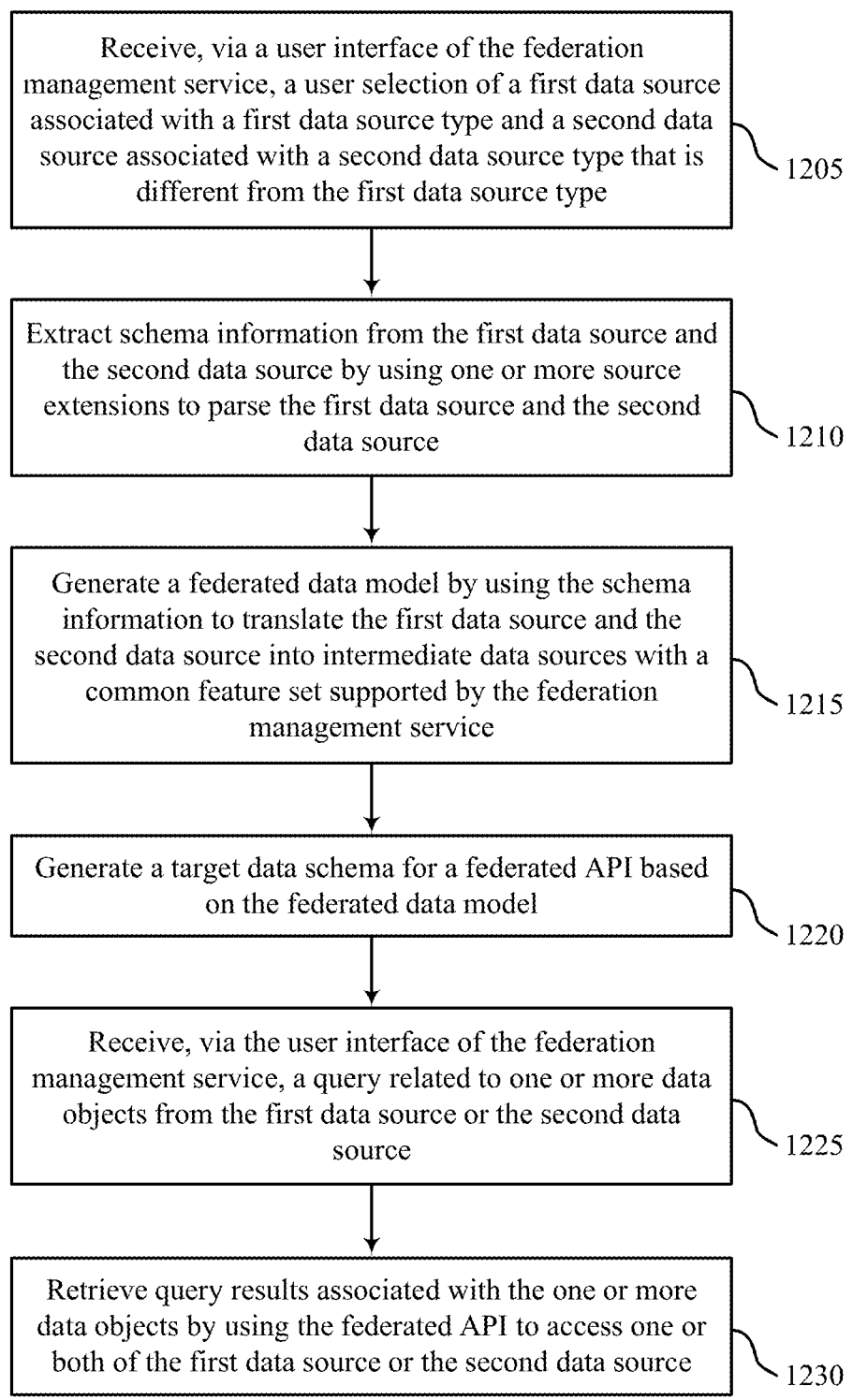

FIG. 12 shows a flowchart illustrating a method 1200 that supports generating a federated API for heterogenous data sources in accordance with aspects of the present disclosure. The operations of the method 1200 may be implemented by a federation management service or components thereof. For example, the operations of the method 1200 may be performed by a federation management service 205, as described with reference to FIG. 2. In some examples, a federation management service may execute a set of instructions to control the functional elements of the federation management service to perform the described functions. Additionally, or alternatively, the federation management service may perform aspects of the described functions using special-purpose hardware.

At 1205, the federation management service may receive, via a user interface of the federation management service, a user selection of a first data source associated with a first data source type and a second data source associated with a second data source type that is different from the first data source type. The operations of 1205 may be performed in accordance with examples disclosed herein. In some examples, aspects of the operations of 1205 may be performed by a user input receiving component 725, as described with reference to FIG. 7.

At 1210, the federation management service may extract schema information from the first data source and the second data source by using one or more source extensions to parse the first data source and the second data source. The operations of 1210 may be performed in accordance with examples disclosed herein. In some examples, aspects of the operations of 1210 may be performed by a schema information extracting component 730, as described with reference to FIG. 7.

At 1215, the federation management service may generate a federated data model by using the schema information to translate the first data source and the second data source into intermediate data sources with a common feature set supported by the federation management service. The operations of 1215 may be performed in accordance with examples disclosed herein. In some examples, aspects of the operations of 1215 may be performed by a data model generating component 735, as described with reference to FIG. 7.

At 1220, the federation management service may generate a target data schema for a federated API based on the federated data model. The operations of 1220 may be performed in accordance with examples disclosed herein. In some examples, aspects of the operations of 1220 may be performed by a data schema generating component 740, as described with reference to FIG. 7.

At 1225, the federation management service may receive, via the user interface of the federation management service, a query related to one or more data objects from the first data source or the second data source. The operations of 1225 may be performed in accordance with examples disclosed herein. In some examples, aspects of the operations of 1225 may be performed by a user input receiving component 725, as described with reference to FIG. 7.

At 1230, the federation management service may retrieve query results associated with the one or more data objects by using the federated API to access one or both of the first data source or the second data source. The operations of 1230 may be performed in accordance with examples disclosed herein. In some examples, aspects of the operations of 1230 may be performed by a query result retrieving component 750, as described with reference to FIG. 7.

A method for data processing is described. The method may include receiving, via a user interface of a federation management service, a user selection of a first data source associated with a first data source type and a second data source associated with a second data source type that is different from the first data source type. The method may further include extracting schema information from the first data source and the second data source by using one or more source extensions to parse the first data source and the second data source. The method may further include generating a federated data model by using the schema information to translate the first data source and the second data source into intermediate data sources with a common feature set supported by the federation management service. The method may further include generating a target data schema for a federated API based on the federated data model.

An apparatus for data processing is described. The apparatus may include a processor, memory coupled with the processor, and instructions stored in the memory. The instructions may be executable by the processor to cause the apparatus to receive, via a user interface of a federation management service, a user selection of a first data source associated with a first data source type and a second data source associated with a second data source type that is different from the first data source type. The instructions may be further executable by the processor to cause the apparatus to extract schema information from the first data source and the second data source by using one or more source extensions to parse the first data source and the second data source. The instructions may be further executable by the processor to cause the apparatus to generate a federated data model by using the schema information to translate the first data source and the second data source into intermediate data sources with a common feature set supported by the federation management service. The instructions may be further executable by the processor to cause the apparatus to generate a target data schema for a federated API based on the federated data model.

Another apparatus for data processing is described. The apparatus may include means for receiving, via a user interface of a federation management service, a user selection of a first data source associated with a first data source type and a second data source associated with a second data source type that is different from the first data source type. The apparatus may further include means for extracting schema information from the first data source and the second data source by using one or more source extensions to parse the first data source and the second data source. The apparatus may further include means for generating a federated data model by using the schema information to translate the first data source and the second data source into intermediate data sources with a common feature set supported by the federation management service. The apparatus may further include means for generating a target data schema for a federated API based on the federated data model.

A non-transitory computer-readable medium storing code for data processing is described. The code may include instructions executable by a processor to receive, via a user interface of a federation management service, a user selection of a first data source associated with a first data source type and a second data source associated with a second data source type that is different from the first data source type. The instructions may be further executable by the processor to extract schema information from the first data source and the second data source by using one or more source extensions to parse the first data source and the second data source. The instructions may be further executable by the processor to generate a federated data model by using the schema information to translate the first data source and the second data source into intermediate data sources with a common feature set supported by the federation management service. The instructions may be further executable by the processor to generate a target data schema for a federated API based on the federated data model.

Some examples of the method, apparatuses, and non-transitory computer-readable medium described herein may further include operations, features, means, or instructions for obtaining metadata associated with a first data schema of the first data source and a second data schema of the second data source, where generating the target data schema for the federated API is based on the metadata.

Some examples of the method, apparatuses, and non-transitory computer-readable medium described herein may further include operations, features, means, or instructions for receiving, via the user interface of the federation management service, a user input that includes one or more metadata annotations associated with the first data source and the second data source, where generating the target data schema for the federated API is based on the one or more metadata annotations.

Some examples of the method, apparatuses, and non-transitory computer-readable medium described herein may further include operations, features, means, or instructions for receiving, via the user interface of the federation management service, a query related to one or more data objects from the first data source or the second data source.

Some examples of the method, apparatuses, and non-transitory computer-readable medium described herein may further include operations, features, means, or instructions for retrieving query results associated with the one or more data objects by using the federated API to access one or both of the first data source or the second data source.

Some examples of the method, apparatuses, and non-transitory computer-readable medium described herein may further include operations, features, means, or instructions for transmitting, for display at the user interface of the federation management service, an indication of the query results associated with the one or more data objects.

Some examples of the method, apparatuses, and non-transitory computer-readable medium described herein may further include operations, features, means, or instructions for retrieving schema version information and run-time information associated with one or both of the first data source or the second data source, where the federated API uses the schema version information and the run-time information to access one or both of the first data source or the second data source.

In some examples of the method, apparatuses, and non-transitory computer-readable medium described herein, generating the federated data model may include operations, features, means, or instructions for mapping a first set of features supported by the first data source and a second set of features supported by the second data source to the common feature set supported by the federation management service.

In some examples of the method, apparatuses, and non-transitory computer-readable medium described herein, generating the federated data model may include operations, features, means, or instructions for generating a semantic graph representation and an extended graph representation of the intermediate data sources using a parsing plug-in that interfaces with the one or more source extensions.

In some examples of the method, apparatuses, and non-transitory computer-readable medium described herein, the common feature set supported by the federation management service includes read operations, write operations, pagination operations, streaming operations, or a combination thereof.

In some examples of the method, apparatuses, and non-transitory computer-readable medium described herein, the first data source and the second data source may have different feature sets and different API formats.

In some examples of the method, apparatuses, and non-transitory computer-readable medium described herein, one or both of the first data source or the second data source may include a REST API, a GraphQL API, or an AsyncAPI.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random access memory (RAM), read-only memory (ROM), electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, via a user interface of a federation management service, a user selection of a first data source associated with a first data source type corresponding to a first application programming interface (API) and a second data source associated with a second data source type corresponding to a second API, wherein the second data source type is different from the first data source type and the second API is different from the first API;
   extracting schema information from the first data source that corresponds to the first API and the second data source that corresponds to the second API by using one or more source extensions to parse the first data source and the second data source, the schema information from the first data source indicating a first capability feature set supported by the first data source that indicates a first set of operations that the first data source is capable of performing and the schema information from the second data source indicating a second capability feature set supported by the second data source that indicates a second set of operations that the second data source is capable of performing, wherein the second capability feature set supported by the second data source is different from the first capability feature set supported by the first data source based at least in part on at least one operation within the first set of operations of the first capability feature set that is supported by the first data source being unsupported by the second data source;

translating the schema information from the first data source that corresponds to the first API into a first intermediate data source and the schema information from the second data source that corresponds to the second API into a second intermediate data source, wherein translating the schema information from the first data source into the first intermediate data source and translating the schema information from the second data source into the second intermediate data source comprises removing one or more capability features from the first capability feature set supported by the first data source to generate a common capability feature set for the first intermediate data source and the second intermediate data source that is supported by the federation management service, the first data source, and the second data source, wherein the common capability feature set indicates a common set of operations that the federation management service, the first data source, and the second data source are capable of performing, and wherein the one or more capability features removed are associated with the at least one operation within the first set of operations of the first capability feature set that is supported by the first data source and unsupported by the second data source;

generating a federated data model by integrating the first intermediate data source with the second intermediate data source based at least in part on translating the schema information from the first data source into the first intermediate data source and translating the schema information from the second data source into the second intermediate data source including the removal of the one or more capability features from the first capability feature set to generate the common capability feature set for the first intermediate data source and the second intermediate data source that is supported by the federation management service, wherein generation of the federated data model further comprises a generation of a semantic graph representation and an extended graph representation of the first intermediate data source and the second intermediate data source using a parsing plug-in that interfaces with the one or more source extensions; and generating a target data schema for a federated API that provides access to both the first data source that corresponds to the first API and the second data source that corresponds to the second API, wherein the target data schema for the federated API is generated based at least in part on the federated data model that includes an integration of the first intermediate data source and the second intermediate data source.

2. The method of claim 1, further comprising:
obtaining metadata associated with a first data schema of the first data source that corresponds to the first API and a second data schema of the second data source that corresponds to the second API, wherein generating the target data schema for the federated API is based at least in part on the metadata.

3. The method of claim 1, further comprising:
receiving, via the user interface of the federation management service, a user input that comprises one or more metadata annotations associated with the first data source that corresponds to the first API and the second data source that corresponds to the second API, wherein generating the target data schema for the federated API is based at least in part on the one or more metadata annotations.

4. The method of claim 1, further comprising:
receiving, via the user interface of the federation management service, a query related to one or more data objects from the first data source that corresponds to the first API or the second data source that corresponds to the second API; and
retrieving query results associated with the one or more data objects by using the federated API to access one or both of the first data source or the second data source.

5. The method of claim 4, further comprising:
transmitting, for display at the user interface of the federation management service, an indication of the query results associated with the one or more data objects.

6. The method of claim 4, further comprising:
retrieving schema version information and run-time information associated with one or both of the first data source that corresponds to the first API or the second data source that corresponds to the second API, wherein the federated API uses the schema version information and the run-time information to access one or both of the first data source that corresponds to the first API or the second data source that corresponds to the second API.

7. The method of claim 1, wherein generating the federated data model comprises:
mapping a first set of capability features supported by the first data source that corresponds to the first API and a second set of capability features supported by the second data source that corresponds to the second API to the common capability feature set supported by the federation management service, the first data source, and the second data source.

8. The method of claim 1, wherein the common capability feature set supported by the federation management service, the first data source, and the second data source, includes read operations, write operations, pagination operations, streaming operations, or a combination thereof.

9. The method of claim 1, wherein the first data source that corresponds to the first API and the second data source that corresponds to the second API have different capability feature sets and different API formats.

10. The method of claim 1, wherein one or both of the first API or the second API comprise a Representational State Transfer API, a Graph Query Language API, or an AsyncAPI.

11. An apparatus for data processing, comprising:
one or more processors;
one or more memories coupled with the one or more processors; and instructions stored in the one or more memories and executable by the one or more processors to cause the apparatus to:

receive, via a user interface of a federation management service, a user selection of a first data source associated with a first data source type corresponding to a first application programming interface (API) and a second data source associated with a second data source type corresponding to a second API, wherein the second data source type is different from the first data source type and the second API is different from the first API;

extract schema information from the first data source that corresponds to the first API and the second data source that corresponds to the second API by using one or more source extensions to parse the first data source and the second data source, the schema information from the first data source indicating a first capability feature set supported by the first data source that indicates a first set of operations that the first data source is capable of performing and the schema information from the second data source indicating a second capability feature set supported by the second data source that indicates a second set of operations that the second data source is capable of performing, wherein the second capability feature set supported by the second data source is different from the first capability feature set supported by the first data source based at least in part on at least one operation within the first set of operations of the first capability feature set that is supported by the first data source being unsupported by the second data source;

translate the schema information from the first data source that corresponds to the first API into a first intermediate data source and the schema information from the second data source that corresponds to the second API into a second intermediate data source, wherein translating the schema information from the first data source into the first intermediate data source and translating the schema information from the second data source into the second intermediate data source comprises removing one or more capability features from the first capability feature set supported by the first data source to generate a common capability feature set for the first intermediate data source and the second intermediate data source that is supported by the federation management service, the first data source, and the second data source, wherein the common capability feature set indicates a common set of operations that the federation management service, the first data source, and the second data source are capable of performing, and wherein the one or more capability features removed are associated with the at least one operation within the first set of operations of the first capability feature set that is supported by the first data source and unsupported by the second data source;

generate a federated data model by integrating the first intermediate data source with the second intermediate data source based at least in part on translating the schema information from the first data source into the first intermediate data source and translating the schema information from the second data source into the second intermediate data source including the removal of the one or more capability features from the first capability feature set to generate the common capability feature set for the first intermediate data source and the second intermediate data source that is supported by the federation management service, wherein generation of the federated data model further comprises a generation of a semantic graph representation and an extended graph representation of the first intermediate data source and the second intermediate data source using a parsing plug-in that interfaces with the one or more source extensions; and generate a target data schema for a federated API that provides access to both the first data source that corresponds to the first API and the second data source that corresponds to the second API, wherein the target data schema for the federated API is generated based at least in part on the federated data model that includes an integration of the first intermediate data source and the second intermediate data source.

12. The apparatus of claim 11, wherein the instructions are further executable by the one or more processors to cause the apparatus to:

obtain metadata associated with a first data schema of the first data source that corresponds to the first API and a second data schema of the second data source that corresponds to the second API, wherein generating the target data schema for the federated API is based at least in part on the metadata.

13. The apparatus of claim 11, wherein the instructions are further executable by the one or more processors to cause the apparatus to:

receive, via the user interface of the federation management service, a user input that comprises one or more metadata annotations associated with the first data source that corresponds to the first API and the second data source that corresponds to the second API, wherein generating the target data schema for the federated API is based at least in part on the one or more metadata annotations.

14. The apparatus of claim 11, wherein the instructions are further executable by the one or more processors to cause the apparatus to:

receive, via the user interface of the federation management service, a query related to one or more data objects from the first data source that corresponds to the first API or the second data source that corresponds to the second API; and retrieve query results associated with the one or more data objects by using the federated API to access one or both of the first data source or the second data source.

15. The apparatus of claim 14, wherein the instructions are further executable by the one or more processors to cause the apparatus to:

transmit, for display at the user interface of the federation management service, an indication of the query results associated with the one or more data objects.

16. The apparatus of claim 14, wherein the instructions are further executable by the one or more processors to cause the apparatus to:

retrieve schema version information and run-time information associated with one or both of the first data source that corresponds to the first API or the second data source that corresponds to the second API, wherein the federated API uses the schema version information and the run-time information to access one or both of the first data source that corresponds to the first API or the second data source that corresponds to the second API.

17. The apparatus of claim 11, wherein the instructions to generate the federated data model are executable by the one or more processors to cause the apparatus to:

map a first set of capability features supported by the first data source that corresponds to the first API and a second set of capability features supported by the second data source that corresponds to the second API to the common capability feature set supported by the federation management service, the first data source, and the second data source.

18. A non-transitory computer-readable medium storing code for data processing, the code comprising instructions executable by one or more processors to:

receive, via a user interface of a federation management service, a user selection of a first data source associated with a first data source type corresponding to a first application programming interface (API) and a second data source associated with a second data source type corresponding to a second API, wherein the second data source type is different from the first data source type and the second API is different from the first API;

extract schema information from the first data source that corresponds to the first API and the second data source that corresponds to the second API by using one or more source extensions to parse the first data source and the second data source, the schema information from the first data source indicating a first capability feature set supported by the first data source that indicates a first set of operations that the first data source is capable of performing and the schema information from the second data source indicating a second capability feature set supported by the second data source that indicates a second set of operations that the second data source is capable of performing, wherein the second capability feature set supported by the second data source is different from the first capability feature set supported by the first data source based at least in part on at least one operation within the first set of operations of the first capability feature set that is supported by the first data source being unsupported by the second data source;

translating the schema information from the first data source that corresponds to the first API into a first intermediate data source and the schema information from the second data source that corresponds to the second API into a second intermediate data source, wherein translating the schema information from the first data source into the first intermediate data source and translating the schema information from the second data source into the second intermediate data source comprises removing one or more capability features from the first capability feature set supported by the first data source to generate a common capability feature set for the first intermediate data source and the second intermediate data source that is supported by the federation management service, the first data source, and the second data source, wherein the common capability feature set indicates a common set of operations that the federation management service, the first data source, and the second data source are capable of performing, and wherein the one or more capability features removed are associated with the at least one operation within the first set of operations of the first capability feature set that is supported by the first data source and unsupported by the second data source;

generating a federated data model by integrating the first intermediate data source with the second intermediate data source based at least in part on translating the schema information from the first data source into the first intermediate data source and translating the schema information from the second data source into the second intermediate data source including the removal of the one or more capability features from the first capability feature set to generate the common capability feature set for the first intermediate data source and the second intermediate data source that is supported by the federation management service, wherein generation of the federated data model further comprises a generation of a semantic graph representation and an extended graph representation of the first intermediate data source and the second intermediate data source using a parsing plug-in that interfaces with the one or more source extensions; and generate a target data schema for a federated API that provides access to both the first data source that corresponds to the first API and the second data source that corresponds to the second API, wherein the target data schema for the federated API is generated based at least in part on the federated data model that includes an integration of the first intermediate data source and the second intermediate data source.

* * * * *